United States Patent [19]

Wasson et al.

[11] Patent Number: 4,937,114
[45] Date of Patent: Jun. 26, 1990

[54] COATING PROCESS

[75] Inventors: Eleanor A. Wasson, Hanworth; John W. Nicholson, Hampton, both of England

[73] Assignee: National Research Development Corporation, London, England

[21] Appl. No.: 348,535

[22] Filed: May 8, 1989

[30] Foreign Application Priority Data

May 20, 1988 [GB] United Kingdom ................ 8811939

[51] Int. Cl.$^5$ ............................ B05D 3/02; B27N 5/02
[52] U.S. Cl. ............................... 428/35.8; 427/388.4; 428/461
[58] Field of Search .................... 427/388.4; 428/35.8, 428/461

[56] References Cited

FOREIGN PATENT DOCUMENTS 61-163946 7/1986 Japan .
2173805A 10/1986 United Kingdom .

*Primary Examiner*—Michael Lusignan
*Attorney, Agent, or Firm*—Nixon & Vanderhye

[57] ABSTRACT

An aluminium or tinned-steel can for carbonated beverage is protected by a low-temperature curing lacquer.

The lacquer is applied as an aqueous coating formulation of ethylene maleic acid copolymer (containing KOH to promote decarboxylation) plus some poly(acrylic acid) to promote coherent-film-forming ability plus a diol cross-linking agent to reduce the water-sensitivity.

The coated substrate is heat-cured at the relatively low temperature of 200° C. for 10 minutes.

22 Claims, No Drawings

COATING PROCESS

This invention relates to a coating process for substrates comprising elemental metal or an alloy thereof, to prevent their interaction with fluid media, especially aqueous fluid media, into contact with which they might otherwise come; and to substrates so coated.

UK Patent Application GB 2173805A describes a process for the preparation of a coherent protective layer on a substrate surface of a body (i.e. a coating process), the substrate surface comprising elemental metal or an alloy thereof, which process comprises applying to the substrate surface an aqueous solution of a partially neutralised homo- or copolymer of a mono- or polybasic ethylenically unsaturated acid; and heat-curing the layer so formed at a temperature above 180° C. Examples disclosed of the homo-or copolymers include those prepared by the homopolymerisation or copolymerisation of aconitic acid, acrylic acid, citraconic acid, fumaric acid. glutaconic acid, itaconic acid, maleic acid, mesaconic acid, methacrylic acid, muconic acid and tiglic acid, and the copolymerisation of these acids with other unsaturated aliphatic monomers for example vinyl monomers, such as vinyl hydrocarbon monomers, vinyl ethers, acrylamide or acrylonitrile. These were in practice cured for 10 minutes at temperatures of 235° C. or 250° C. which was costly in energy and restricted the range of usable substrate materials.

According to the present invention, a coating process for a metallic substrate comprises applying an aqueous solution to the substrate and heat-curing, characterised by the solution containing from 5 to 20 parts by weight of ethylene-maleic acid 1: (½ to 2) copolymer and 1 part of a carboxylic acid or anhydride having COOH groups or precursors pendant from half the carbons (e.g. alternate carbons) of an alkane (or substantially alkane) backbone. such as poly(acrylic acid). the heat-curing preferably being performed at 170° C. to 220° C. more preferably 180° C. to 200° C. The ethylene-maleic acid copolymer is preferably present in 10 to 15 parts in the aqueous solution. Up to 10% (more preferably 5%. most preferably 4%) (based on the weight of ethylene-maleic acid copolymer) of a hydroxide (preferably a decarboxylation promoter such as KOH) may be present, and preferably in addition a cross-linking agent (for promoting hydrophobicity) such as a diol (preferably with OH groups spaced at least three —CH$_2$— groups apart) is present such as pentanediol or neopentylglycol to give the equivalent of from 50% (preferably from 75%) to 200% (preferably to 160%) esterification. The diol should not have too low a molecular weight, or else it volatilises and if the OH groups are too closely spaced it yields a brittle cured product. α, ω diols may be used. Neopentylglycol adhered worse than pentanediol but imparted better hydrophobicity. A surfactant is also preferably present. KOH has shown itself to be a superior decarboxylation promoter to NaOH, the reaction terminating more sharply and after less elapsed time, The excess of diol hydroxyl groups present on esterification (hence 'equivalent to' over 100% in some cases) ensures that all —COOH groups, which are water-sensitive, will have been reacted—thus reducing the solubility of the final coating.

The substrate may be formed into a container for liquid such as an optionally carbonated beverage. or for other aggressive contents such as fruit in syrup or other food, and may for example be steel, optionally tin or chromium plated, or aluminium. The aqueous solution as applied preferably contains from 5 to 20% by weight solids. Pigment may be incorporated.

Curing at 200° C. for 10 minutes gave good results, and 180° C. for 20 minutes was often nearly as good, which would be useful with especially heat-sensitive substrates.

The invention will now be described by way of example.

EXAMPLE 1

An aqueous coating formulation was prepared by adding sufficient potassium hydroxide solution to an aqueous solution of ethylene maleic acid (EMA) to give the equivalent of 10% (by weight) KOH on total EMA solids; this was then made up to a concentration of 15% EMA by weight. To this was added enough of 15% solution of poly(acrylic acid) (PAA) to give a 10:1 EMA to PAA ratio by weight; a few drops of a non-ionic surfactant (Triton-X114 (trade mark) comprising ethoxylated nonyl phenol, ex BDH Ltd.,) were added to improve substrate wetting. The formulation was coated by draw down bar onto a tin-plate substrate dried and cured by heating in air for 10 minutes at 200° C.

The resulting coating was about 5 μm thick, glossy and clear in appearance unlike aqueous coatings described previously (GB 2173805A). which acquired a bronze tint on curing; it showed excellent adhesion to the tin substrate; thus it could be deformed by flexure around a 6 mm mandrel without showing any sign of damage. It was unaffected by soaking in tap water at ambient temperature for one hour; exposure to boiling tap water for one hour resulted in a slight loss of gloss. Deterioration of this coating, because of its translucency, could be detected only by either blushing/loss of gloss (indicating dissolution) or (rarely) break-up, indicating failure of adhesion. Exposure to 3% aqueous sodium chloride solution for 24 hours at ambient temperature resulted in dissolution of the coating; exposure to a carbonated lemon-lime drink (7Up (trade mark)) at ambient temperature for 24 hours showed a slight loss in gloss.

EXAMPLE 2

As for example 1 except that aluminium (mill finish) was used as the substrate. Results were similar to those obtained on tin-plate.

EXAMPLE 3

As for example 1 except that enough 1.5-pentanediol was added to esterify 50% of the available carboxylic acid groups of the ethylene maleic acid. This coating showed some loss of adhesion but exhibited only slight blushing in boiling water and 3% sodium chloride, exposure to 7Up resulted in no loss of gloss.

EXAMPLE 4

Example 3 was repeated except that aluminium was used as the substrate. The resultant coating showed excellent resistance to boiling tap water; all other results were similar to those obtained in example 3.

EXAMPLE 5

Example 3 was repeated except that the EMA:PAA ratio was reduced to 5:1. The resultant coating had properties similar to those obtained in example 3.

EXAMPLE 6

Example 5 was repeated except that aluminium was used as the substrate. The resultant coating was similar to that obtained in example 4.

EXAMPLE 7

Example 3 was repeated except that pentanediol was added to give the equivalent of 160% esterified; potassium hydroxide was added to give 2% by weight. The coating showed improved water and sodium chloride resistance; exposure to 7Up resulted in a slight loss of gloss.. adhesion to the substrate was excellent.

EXAMPLE 8

Example 7 repeated except that the percentage potassium hydroxide was increased to 4%. The resulting coating showed excellent resistance to all tests.

EXAMPLE 9

Example 8 was repeated except that aluminium was used as the substrate. The resulting coating was very similar to that obtained in example 8. In addition the coating showed good resistance to boiling acetic acid (5% aqueous solution) for one hour; it also showed good resistance to exposure to a citrate/brine buffer solution for 24 hours at 22° C.

EXAMPLE 10

Example 8 was repeated except that mild steel was used as the substrate. Resistance to boiling water; sodium chloride and 7Up was inferior to those obtained in example 8.

EXAMPLE 11

Example 8 was repeated except that electrocoated chromium steel ('Hi-top', ex British Steel Co.) was used as the substrate. Adhesion and resistance to sodium chloride were inferior to those obtained in example 8.

EXAMPLE 12

Examples 8-11 were repeated except that the ratio of EMA:PAA was increased to 15:1. The resultant coating was similar to those obtained in these examples; adhesion to electrocoated chromium steel was improved slightly.

EXAMPLE 13

Examples 8-11 were repeated except that the pentanediol was replaced with 160% neopentylglycol. The resultant coatings were similar to those obtained in examples 8-11; adhesion to electrocoated chromium steel was inferior to example 11.

EXAMPLE 14

Example 13 was repeated except that 200% neopentylglycol was used. The resultant coatings were very similar to those obtained in example 13.

EXAMPLE 15

Example 8 was repeated using 25% pentanediol and 15:1 EMA:PAA ratio. The resultant coating showed good resistance to all tests.

EXAMPLE 16

Example 15 was repeated using 75% pentanediol. The resultant coating was very similar to that obtained in example 15.

EXAMPLE 17

Example 15 was repeated except that 75% neopentylglycol was used in place of the pentanediol. The resultant coating was very similar to that obtained in example 15.

EXAMPLE 18

Example 17 was repeated using 100% neopentylglycol. The resultant coating was very similar to that obtained for example 17.

EXAMPLE 19

Examples 13, 14, 17, 18 were repeated using aluminium as the substrate. The resultant coatings gave similar results to examples 17-18; exposure to boiling acetic acid for 1 hour resulted in no loss of gloss; exposure to citrate/brine buffer for 24 hours at 22° C. also resulted in no loss of gloss.

EXAMPLE 20

Example 19 was repeated using mild steel as the substrate; all formulations on this substrate showed inferior resistance to 3% sodium chloride, hot and cold water and 7Up.

EXAMPLE 21

Example 20 was repeated using electrocoated chromium steel as the substrate. The resultant coating showed similar results.

Six comparative examples, not according to the invention. will now be described.

COMPARATIVE EXAMPLES

C11. EMA only. A solution containing 15% by weight of ethylene maleic acid was prepared and coated by draw-down bar onto tin plate; dried; and cured at 200° C. for 10 minutes.

The resultant coating had high gloss, was clear and showed good adhesion and flexibility; it did however, blush after 1 hour in cold tap water; exposure to boiling water for 1 hour resulted in dissolution of the coating. Resistance to 7Up and methyl isobutyl ketone was good. Solutions containing EMA and PAA in ratios of 1:1 and 2:1 yielded patchy white films which did not cure well except by raising the temperature. Using ratios of 40:1 and higher meant that there was insufficient PAA to improve the rather poor film-forming ability of EMA.

C2. EMA plus ions. In the presence of Na+, Li+ and K+ EMA forms poor films. The coatings contain large areas of pinholes; adhesion to tin-plate is poor; resistance to boiling tap water, sodium chloride solution and 7Up are also poor.

C3. PAA plus sodium . A solution was prepared containing 5% by weight sodium hydroxide based on the PAA. This was sufficient to neutralise 10% of the available carboxylic acid groups. The resultant coating gives good adhesion, gloss and chemical resistance when cured for 10 minutes at 250° C. The coating obtained when cured at 200° C. for 10 minutes is noticeably inferior; resistance to boiling water, sodium chloride and 7Up is poor.

C4. EMA plus pentanediol. A solution containing enough pentanediol to give the equivalent of 50% esterification was prepared and coated onto tin plate; cured at 200° C. for 10 minutes and tested. The resultant coating showed poor resistance to boiling water. sodium chloride and 7Up.

C5. EMA plus neopentylglycol. A solution containing 50% neopentylglycol was prepared and cured as above. The resultant coating showed similar results to 4 above.

C6. EMA:AA copolymer. A 1:1 copolymer was used at 15% solids in the presence of 10% potassium hydroxide based on the total weight of copolymer. The resultant coating was cured at 200° C. for 10 minutes before being tested. The resultant coating showed poor resistance to boiling water, boiling acetic acid, NaCl solution and 7Up. C6A (see following summary) otherwise similar contained pentanediol but there was no significant improvement.

The foregoing examples, with further examples not discussed in detail, are summarised as follows:

tion; see Example C6B which, lacking diol at low EMA:PAA, is not according to the invention. Increasing ionic hydroxide can somewhat compensate for absence of diol. The converse is untrue; that is, some ionic hydroxide must indispensibly be present, otherwise curing via formation of intermediate anhydride will not occur.

We claim:

1. A coating process for a metallic substrate, comprising applying an aqueous solution to the substrate and heat-curing, characterised by the solution containing from 5 to 20 parts by weight of ethylene-maleic acid 1:(¼ to 2) copolymer and 1 part of a carboxylic acid or anhydride having COOH groups or precursors pendant from half the carbons of an alkane backbone.

2. A process according to claim 1, wherein the said carboxylic acid is poly(acrylic acid).

| No | EMA:PAA | hydroxide | diol, amount in % esterification equivalent | remarks |
|---|---|---|---|---|
| 1 | 10:1 | 10% KOH | — | good |
| 3 | 10:1 | 10% KOH | 1,5-pentanediol 50% | good |
| 5 | 5:1 | 10% KOH | 1,5-pentanediol 50% | good |
| 7 | 10:1 | 2% KOH | 1,5-pentanediol 160% | good |
| 8 | 10:1 | 4% KOH | 1,5-pentanediol 160% | very good |
| 12 | 15:1 | 4% KOH | 1,5-pentanediol 160% | very good |
| 13 | 10:1 | 4% KOH | neopentylglycol 160% | very good |
| 14 | 10:1 | 4% KOH | neopentylglycol 200% | good |
| 15 | 15:1 | 4% KOH | 1,5-pentanediol 50% | good |
| 16 | 15:1 | 4% KOH | 1,5-pentanediol 75% | very good |
| 17 | 15:1 | 4% KOH | neopentylglycol 75% | good |
| 18 | 15:1 | 4% KOH | neopentylglycol 100% | very good |
| C1 | 1.0 | nil | nil | good? |
| C2 | 1:0 | Li,Na,K | nil | poor |
| C3 | 0:1 | 5% NaOH* | nil | poor |
| C4 | 1:0 | nil | 1,5-pentanediol 50% | poor |
| C5 | 1:0 | nil | neopentylglycol 50% | poor |
| C6 | copolymer | 10% KOH* | nil | poor |
| C6A | copolymer | 10% KOH** | pentanediol 160% | poor |
| C6B | 5:1 | 10% KOH | nil | poor |
| C7 | 2:1 | 10% KOH | nil | poor |
| C8 | 1:1 | 10% KOH | nil | poor |
| CC | 10:1 | nil | nil | poor |
| CD | 5:1 | nil | nil | poor |
| 25 | 10:1 | 5% KOH | nil | poor |
| 26 | 5:1 | 5% KOH | nil | poor |
| C9 | 10:1 | nil | 1,5-pentanediol 50% | poor |
| C10 | 5:1 | nil | 1,5-pentanediol 50% | poor |
| 27 | 10:1 | 10% KOH | 2-hydroxyethyl ether 25% | good |
| 28 | 5:1 | 10% KOH | 2-hydroxyethyl ether 25% | moderately good |
| C11 | 10:1 | nil | 2-hydroxyethyl ether 25% | poor |
| C12 | 5:1 | nil | 2-hydroxyethyl ether 25% | poor |
| C13 | 5–10:1 | 0–5% KOH | Morpholine 10% | poor |
| 29 | 20:1 | 10% KOH | nil | moderately good |
| 30 | 15:1 | 10% KOH | nil | good |
| C14 | 40:1 | 10% KOH | nil | didn't form film |
| C15 | 30:1 | 10% KOH | nil | didn't form film |
| 31 | 10:1 | 10% KOH | 1,5-pentanediol 10% | good resistance |
| 32 | 10:1 | 10% KOH | 1,5-pentanediol 100% | good |
| 33 | 10:1 | 10% KOH | 1,5-pentanediol 150% | good |
| 34 | 10:1 | 10% KOH | 1,5-pentanediol 200% | pinholes in film |
| 35 | 10:1 | 5% KOH | 1,5 pentanediol 50% | good |
| C16 | 10:1 | 15% KOH | 1,5 pentanediol 50% | low adhesion |
| C17 | 10:1 | 20% KOH | 1,5 pentanediol 50% | low adhesion |
| 36 | 10:1 | 2% KOH | 1,5 pentanediol 50% | moderately good |
| 37 | 10:1 | 8% KOH | 1,5 pentanediol 50% | moderately good |
| 38 | 10:1 | 4% KOH | 1,5 pentanediol 50% | moderately good |
| 39 | 15:1 | 2% KOH | 1,5-pentanediol 160% | moderately good |
| 40 | 10:1 | 10% KOH | neopentylglycol 50% | good |
| 41 | 15:1 | 4% KOH | neopentylglycol 50% | good |
| 42 | 15:1 | 4% KOH | neopentylglycol 160% | good |
| 43 | 10:1 | 4% KOH | neopentylglycol 200% | very good |
| C18 | 15:1 | 4% KOH | 1,5-pentanediol 25% | good |
| 44 | 15:1 | 4% KOH | 1,5-pentanediol 100% | good |

*based on PAA
**based on total copolymer

At lower EMA:PAA ratios, diol is more necessary to be present to esterify the PAA to enhance film forma- 3. A process according to claim 1 wherein the heat-curing is performed at 170° C. to 220° C.

4. A process according to claim 3, wherein the heat-curing is performed at 180° C. to 200° C.

5. A process according to claim 1, wherein the ethylene-maleic acid copolymer is present in 10 to 15 parts in the aqueous solution.

6. A process according to claim 1 wherein up to 10%, based on the weight of the ethylene-maleic acid copolymer, of a hydroxide is present.

7. A process according to claim 6, wherein up to 5% of said hydroxide is present.

8. A process according to claim 6, wherein up to 4% of said hydroxide is present.

9. A process according to any of claims 6 to 8, wherein the hydroxide is a decarboxylation promoter.

10. A process according to claim 9, wherein said hydroxide is KOH.

11. A process according to claim 1 wherein a cross-linking agent is present in an amount to give the equivalent of from 50% to 200% esterification.

12. A process according to claim 11 wherein said cross-linking agent is a diol.

13. A process according to claim 12 wherein the diol is an $\alpha, \omega$ diol.

14. A process according to claim 1 wherein the OH groups in the diol are spaced at least three —$CH_2$— groups apart.

15. A process according to claim 14 wherein the diol is neopentylglycol or pentanediol.

16. A process according to claim 1 wherein the amount of the cross-linking agent is equivalent to at least 75% esterification.

17. A process according to claim 1 wherein the amount of the cross-linking agent is equivalent to at most 160% esterification.

18. A process according to claim 1 wherein the aqueous solution contains a surfactant.

19. A process according to claim 1 wherein the aqueous solution contains a pigment.

20. A process according to claim 1 wherein said aqueous solution when applied contains from 5 to 20% by weight solids.

21. A process according to claim 1 wherein the substrate is aluminium or (optionally tin- or chromium-plated) steel.

22. A container, comprising, a substrate which has been coated by a process according to claim 1.

* * * * *